United States Patent [19]

Hill

[11] Patent Number: 5,356,209
[45] Date of Patent: Oct. 18, 1994

[54] TWO-PIECE AXLE BOLT FOR SKATE WHEEL MOUNTING

[75] Inventor: Martin H. Hill, Syracuse, N.Y.
[73] Assignee: Built for Speed, Inc., Syracuse, N.Y.
[21] Appl. No.: 63,303
[22] Filed: May 19, 1993
[51] Int. Cl.⁵ .............................................. B60B 37/10
[52] U.S. Cl. ................................... 301/5.7; 280/11.23
[58] Field of Search ................... 301/5.3, 5.7, 111; 280/11.19, 11.22, 11.23

[56] References Cited

U.S. PATENT DOCUMENTS

| | | | |
|---|---|---|---|
| 1,217,761 | 2/1917 | Hartman | 280/11.23 |
| 2,172,387 | 9/1939 | Kantrowitz | 280/11.23 |
| 2,220,557 | 11/1940 | User | 280/11.22 |
| 4,666,168 | 5/1987 | Hamill et al. | 280/11.23 |

FOREIGN PATENT DOCUMENTS

| | | | |
|---|---|---|---|
| 827913 | 1/1952 | Fed. Rep. of Germany | 280/11.23 |
| 816753 | 8/1937 | France | 280/11.22 |

*Primary Examiner*—Russell D. Stormer
*Attorney, Agent, or Firm*—Staas & Halsey

[57] ABSTRACT

A two-piece axle bolt for mounting an in-line skate wheel between the spaced side walls of an in-line U-shaped skate frame. The side walls of the U-shaped skate frame have respective outer faces and respective axle receiving and mounting holes extending therethrough. A bolt head receiving counterbore is formed in the outer face of each of the side walls around the hole. The axle bolt includes a pair of shaft components, each having an elongated central axle shaft portion and an enlarged head disposed at one end of the shaft portion. One of the shaft components has a male threaded segment at the other end of the shaft portion and the other shaft component has a female threaded segment at the other end of the shaft portion. The male and female segment are threadably engaged so that the central shaft portions are in axial alignment to thereby present the two-piece axle bolt. The heads are received within the counterbores so that the outer end surfaces of the head do not project outwardly substantially beyond the outer faces of the side walls.

8 Claims, 2 Drawing Sheets

TWO-PIECE AXLE BOLT FOR SKATE WHEEL MOUNTING

BACKGROUND OF THE INVENTION

1. Field of the Invention

The present invention relates to roller skate wheel mounting and in particular to a two-piece axle bolt for mounting roller skate wheels. More particularly, the two-piece axle bolt has countersunk heads and is particularly suitable for mounting wheels of an in-line roller skate.

2. The Existing Practices

Axle bolts for mounting in-lines wheels of roller blade skates are subjected to extremely large vertical shear forces during operation. In addition, axle bolts which project beyond the sides of the skate frame present safety hazards and tend to be destructive of skating surfaces when skaters take spills. The present invention is directed to solving these problems by providing an axle bolt which distributes forces more evenly during operation and which resists such forces more efficiently. In addition, the axle bolt of the present invention includes a countersunk head which preserves skating surfaces and adds to the overall safety of the skate itself.

SUMMARY OF THE INVENTION

To obviate the problems inherent in prior art skates, the present invention provides a two-piece axle bolt for mounting in-line skate wheels between the spaced side walls of in-line U-shaped skate frames. The skate wheels with which the present invention is utilized, generally include a bearing assembly presenting a centrally disposed axle receiving bore. Additionally, the spaced side walls of such in-line U-shaped skate frames have respective outer faces and each such side wall has a respective axle receiving and mounting hole extending therethrough. In accordance with the invention, a respective bolt head receiving counterbore is formed in the outer face of each side wall around the axle receiving and mounting hole and the axle receiving and mounting holes are disposed in coaxial alignment. The two-piece axle bolt of the invention comprises a pair of shaft components, each having an elongated central axle shaft portion and an enlarged head disposed at one end of the shaft portion. One of the shaft components has a male threaded segment at the other end of the shaft portion while the other shaft component has a female threaded segment at the other end of the shaft portion.

The threaded segments are complimentarily configured and the male segment is threadably engaged within the female segment so that the central shaft portions are held in axial alignment to thereby present the axle bolt. The enlarged heads each are provided with a respective outer end surface which face axially away from the engaged threaded segments. The enlarged heads each also have a respective annular peripheral wall surface which extends around the corresponding outer end surface. The axle bolts are configured so that when the wheel and the frame and the axle bolt are assembled, the joined shaft portions present an axis of rotation for the wheels. The heads are received within the counterbores and the outer end surfaces of the heads are positioned so that they do not project outwardly substantially beyond the outer faces of the side walls.

In a preferred form of the invention, the peripheral wall surfaces are disposed in generally parallel relationship relative to the axis of rotation of the wheel. In addition, the counterbores preferably have internal cylindrical wall surfaces which are disposed in generally parallel relationship relative to the axis of rotation of the wheel. Each of the peripheral wall surfaces is disposed in closely fitted, parallel, force bearing relationship relative to a corresponding cylindrical wall surface.

The counterbores may each have a bottom surface which is disposed generally perpendicularly relative to the axis of rotation of the wheel, and each of the bolt heads has a lower surface which is disposed in closely fitted, parallel, force bearing relationship relative to the corresponding bottom surface.

To facilitate insertion and removal of the bolt, a tool receiving shaped hole may be provided in each of the outer end surfaces of the bolt heads to facilitate loosening and tightening of the bolt.

DETAILED DESCRIPTION OF THE PREFERRED EMBODIMENTS

The present invention relates particularly to an axle bolt arrangement for mounting the in-line wheels of a roller blade skate. The bolt includes male and female parts which are threadably engaged at approximately the middle of the bolt shaft. Respective heads are provided at opposite ends of the bolt, and such heads are configured so as to be complimentarily received in corresponding counterbores in the skate frame so that the outer surfaces of the heads of the bolt are essentially flush with the outer surfaces of the skate frame. The heads of the bolt may each be provided with a recess therein having a non-round configuration, such as a hexagon or the like, so as to accommodate a tightening and loosening tool such as an Allen wrench.

The invention provides an axle bolt having centrally disposed screw threads which assist in distributing forces more evenly and efficiently across the bolt. The invention also provides a counterbore arrangement with rectangular edges which are generally parallel with or perpendicular to the vertical forces imposed on the axle so as to resist such forces in an efficient manner. Accordingly, the present invention provides structure which preserves skating surfaces and adds to the overall strength and safety of the skate itself.

Figure 1:
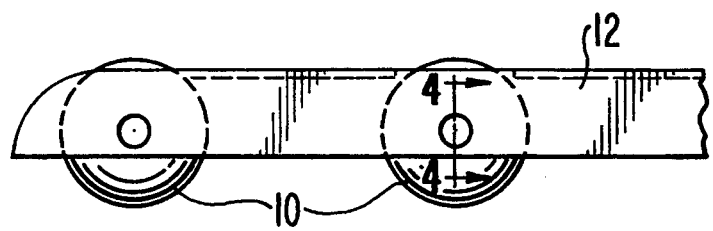
FIG. 1 is a partial, side elevational view of a roller blade assembly having at least two in-line wheels.
Figure 2:
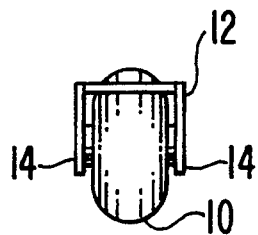
FIG. 2 is an end elevational view of the assembly of FIG. 1.
Figure 3:
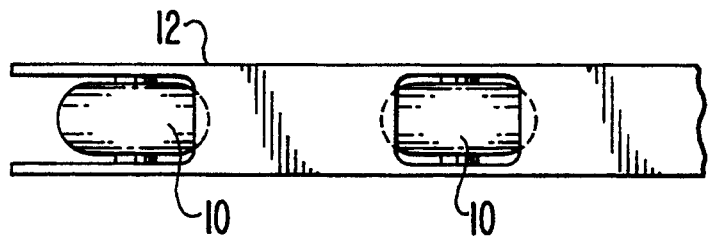
FIG. 3 is a top plan view of the assembly of FIG. 1.
Figure 4:
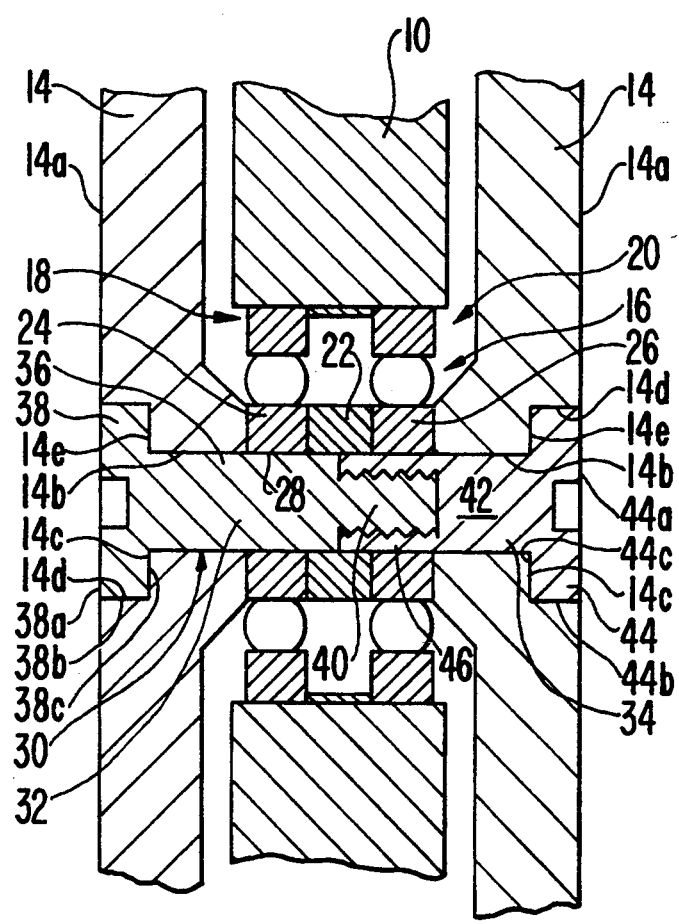
FIG. 4 is a cross-sectional view taken essentially along the line 4—4 of FIG. 1.

With reference to the drawings, the in-line wheels 10 for a roller blade skate are mounted in a U-shaped channel or frame 12 having spaced, opposed side walls 14. With reference to FIG. 4, it can be seen that the wheels 10 each have a centrally disposed, conventional roller bearing assembly 16. Bearing assembly 16 includes a pair of horizontally spaced bearing sets 18 and 20 and an annular spacer 22 therebetween. The bearing sets 18 and 20 include respective annular inner races 24 and 26, and the arrangement is such that the inner surfaces of the inner races 24 and 26 and the inner surface of the spacer 22 present a centrally disposed axle receiving bore 28 in the bearing assembly 16.

Each of the side walls 14 has a respective outer face 14a and a respective axle bolt receiving and mounting hole 14b which extends through each wall 14 as shown in FIG. 4. A respective bolt head receiving counterbore 14c is formed in the outer face 14a of each of the side walls 14 around the corresponding hole 14b. Each of the counterbores 14c has an internal cylindrical surface 14d. As can be seen in FIG. 4, the holes 14b are coaxially aligned.

A two-piece axle bolt 30 is inserted so as to extend through holes 14b and bore 28. As can be seen, axle bolt 30 has a longitudinal axis which is co-axially aligned with holes 14b and bore 28 so as to present an axis of rotation for wheel 10. Axle bolt 30 includes a pair of aligned shaft components 32 and 34. Shaft component 32 includes an elongated central axle shaft portion 36, an enlarged head 38 disposed at one end of shaft portion 36 and a male threaded segment 40 at the other end of axle shaft portion 36. Similarly, shaft component 34 includes an elongated central axle shaft portion 42, an enlarged head 44 disposed at one end of central shaft portion 42 and a female threaded segment 46 located at the other end of shaft portion 42.

The bolt heads 38 and 44, which preferably are circular in transverse cross-sectional configuration, have respective outer end surfaces 38a and 44a and annular peripheral wall surfaces 38b and 44b. The peripheral wall surfaces 38b and 44b are disposed so as to extend around the respective outer end surfaces 38a and 44a. Moreover, the peripheral wall surfaces 38b and 44b are generally annular or circular in shape, and the same are disposed in a generally parallel relationship relative to the longitudinal axis of axle bolt 30. Additionally, the internal cylindrical surfaces 14d of counterbores 14c also are annular and disposed in a generally parallel relationship relative to the axis of the actual bolt 30. And as can be seen in FIG. 4, the annular peripheral wall surfaces 38b and 44b of heads 38 and 44 are each disposed in closely fitted and load bearing relationship relative to the adjacent and therefore corresponding respective wall surface 14d.

The central shaft portions 36 and 42 are disposed in axial alignment. Moreover, the male threaded segment 40 and the female threaded segment 46 are complimentarily configured so that the male segment 40 may be threadably engaged within the female segment 46. When the male threaded segment 40 and the female threaded segment 46 are threadably interengaged, as shown in FIG. 4, the heads 38 and 44 are disposed within the counterbores 14c in such a way that the outer end surfaces 38a and 44a do not project outwardly substantially beyond the outer faces 14a of the side walls 14. And as can readily be appreciated, the outer end surfaces 38a and 44a of the enlarged heads 38 and 44 face outwardly in an axial direction away from the engaged threaded segments 40 and 46.

The counterbores 14c each includes an annular bottom surface 14e which is disposed generally perpendicularly relative to the longitudinal axis of the axle bolt 30. Moreover, the enlarged head 38 has a lower surface 38c while the enlarged head 44 has a lower surface 44c. The lower surfaces 38c and 44c are each normally disposed in closely fitted, parallel, load bearing relationship relative to the corresponding bottom surface 14e.

Manifestly, the closely fitted load bearing relationship between the internal surfaces of the counterbores 14 and the external surfaces of the enlarged heads 44, 38 contributes significantly to the ability of the two-piece axle bolt 30 to withstand the forces imposed on the axle bolt during normal functioning. In addition, the centrally disposed location of the threaded segments 40 and 46 operates to distribute forces evenly over the entire extent of the axle bolt 30 so that the overall arrangement is able to resist operational forces more evenly and efficiently across the entire bolt.

It should also be noted that the arrangement of the enlarged heads 38 and 44 and the counterbores 14c provides rectangular edges which are parallel with or perpendicular to the vertical forces imposed on the bolt 30 by the wheel 10 during normal operation. These rectangular parallel and perpendicular edges are able to resist the normal operational forces more efficiently than the frusto-conical surfaces of a more conventional countersunk bolt head receiving hole. On the other hand, whether the counterbore and head arrangement provides rectangular edges or frusto-conical surfaces, the countersunk bolt heads in combination with the centrally disposed screw threads of the present invention provide a novel, efficient and strong arrangement for mounting in-line skate wheels between the spaced side walls of a roller blade skate frame.

I claim:

1. A two-piece axle bolt for mounting an in-line skate wheel having a centrally disposed bearing assembly between the spaced side walls of an in-line U-shaped skate frame, said bearing assembly having a centrally disposed axle receiving bore therein, said side walls each having a respective outer face and a respective axle receiving and mounting hole extending therethrough, there being a respective bolt head receiving counter bore formed in the outer face of each side wall around the hole therein, said axle receiving and mounting holes and said counter bores being disposed in coaxial alignment, said counter bores each having a respective annular inner surface that is spaced radially from said axis, said axle bolt comprising:

a first shaft component having a first elongated central axle shaft portion having a first outer diameter, a first enlarged head disposed at one end of the first shaft portion and a male threaded segment of reduced diameter at the other end of the first shaft portion; and a second shaft component having a second elongated central axle shaft portion having a second outer diameter which is the same as said first outer diameter, a second enlarged head at one end of the second shaft portion and a female threaded segment at the other end of the second shaft portion, said threaded segments being complementarily configured and the male segment being threadably engaged within the female segment so that said central shaft portions are in axial alignment to thereby present said axle bolt, said enlarged heads each having a respective outer end surface which faces axially away from the engaged threaded segments, said enlarged heads each also having a respective peripheral wall surface which extends around the outer end surface, said axle bolt being configured so that when the wheel and the frame and the axle bolt are assembled the shaft portions present a support for said bearing assembly and an axis of rotation for the wheel, said heads are received within the counter bores with said peripheral wall surfaces disposed in closely fitted load bearing relationship relative to an adjacent corresponding annular inner surface of a corresponding counter bore, and the outer end surfaces of the heads do not project outwardly substantially beyond the outer faces of the side walls.

2. A two-piece axle bolt as set forth in claim 1, wherein each said peripheral wall surface is disposed in generally parallel relationship relative to said axis of rotation.

3. A two-piece axle bolt as set forth in claim 1, wherein each of said counter bores has an internal cylindrical wall surface which is disposed in generally parallel relationship relative to said axis, and each of said peripheral wall surfaces is disposed in closely fitted, parallel relationship relative to the corresponding cylindrical wall surface.

4. A two-piece axle bolt as set forth in claim 1, wherein each of said counter bores has a bottom surface which is disposed generally perpendicularly relative to said axis, and each of said heads has a lower surface which is disposed in closely fitted, parallel relationship relative to the corresponding bottom surface.

5. A two-piece axle bolt as set forth in claim 4, wherein each of said counter bores has an internal cylindrical wall surface which is disposed in generally parallel relationship relative to said axis, and each of said peripheral wall surfaces is disposed in closely fitted, parallel relationship relative to the corresponding cylindrical wall surface.

6. A two-piece axle bolt as set forth in claim 1, wherein a tool receiving shaped hole is provided in at least one of said outer end surfaces to facilitate loosening and tightening of said axle bolt.

7. A two-piece axle bolt as set forth in claim 1, wherein at least one of said heads is circular.

8. A two-piece axle bolt as set forth in claim 1, wherein at least one of said peripheral wall surfaces is annular.

* * * * *